Aug. 16, 1932.  F. J. HARDMAN  1,871,987
WINDSHIELD WIPER
Filed March 23, 1929  2 Sheets-Sheet 1
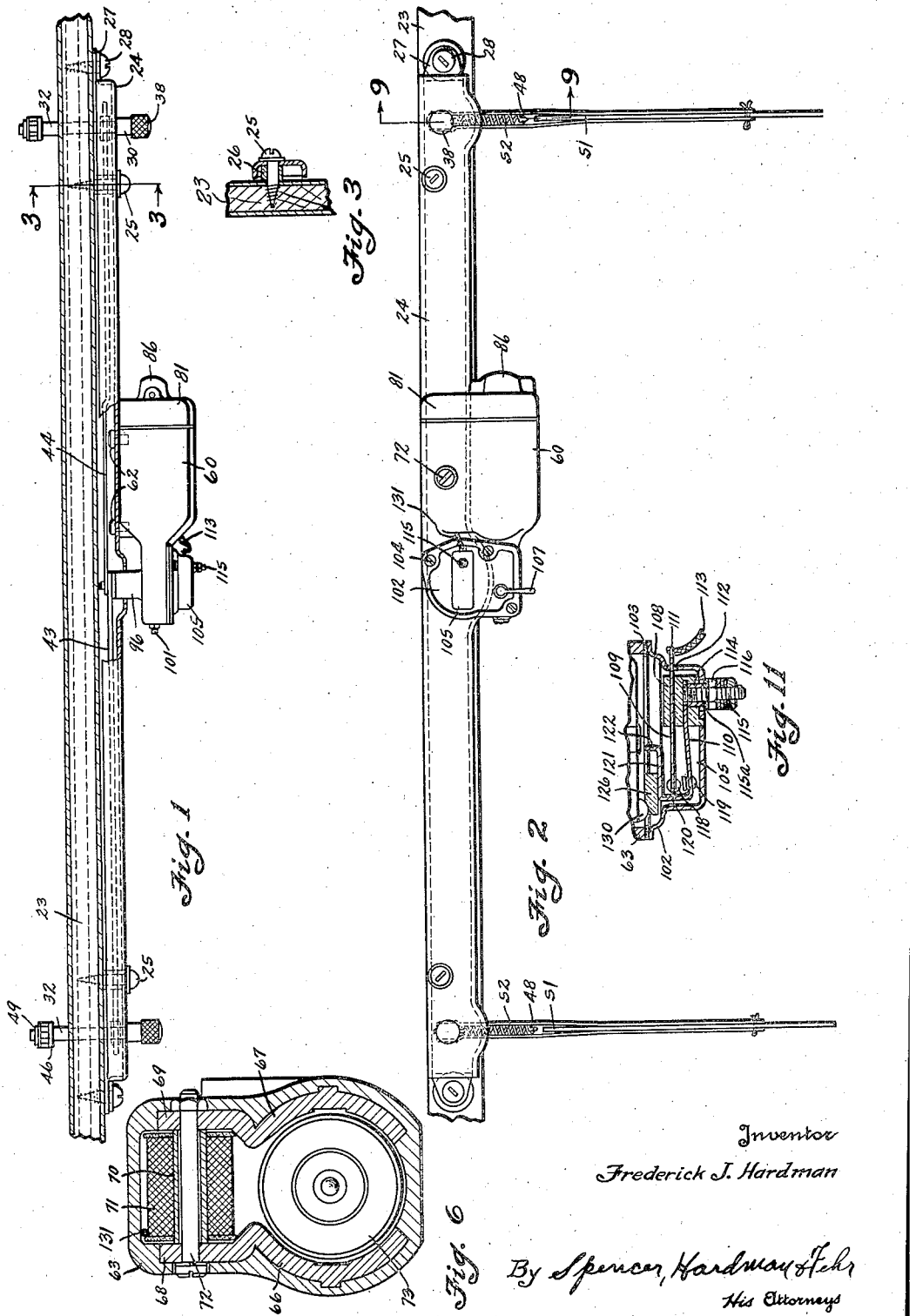
Inventor
Frederick J. Hardman
By Spencer, Hardman & Fehr
His Attorneys

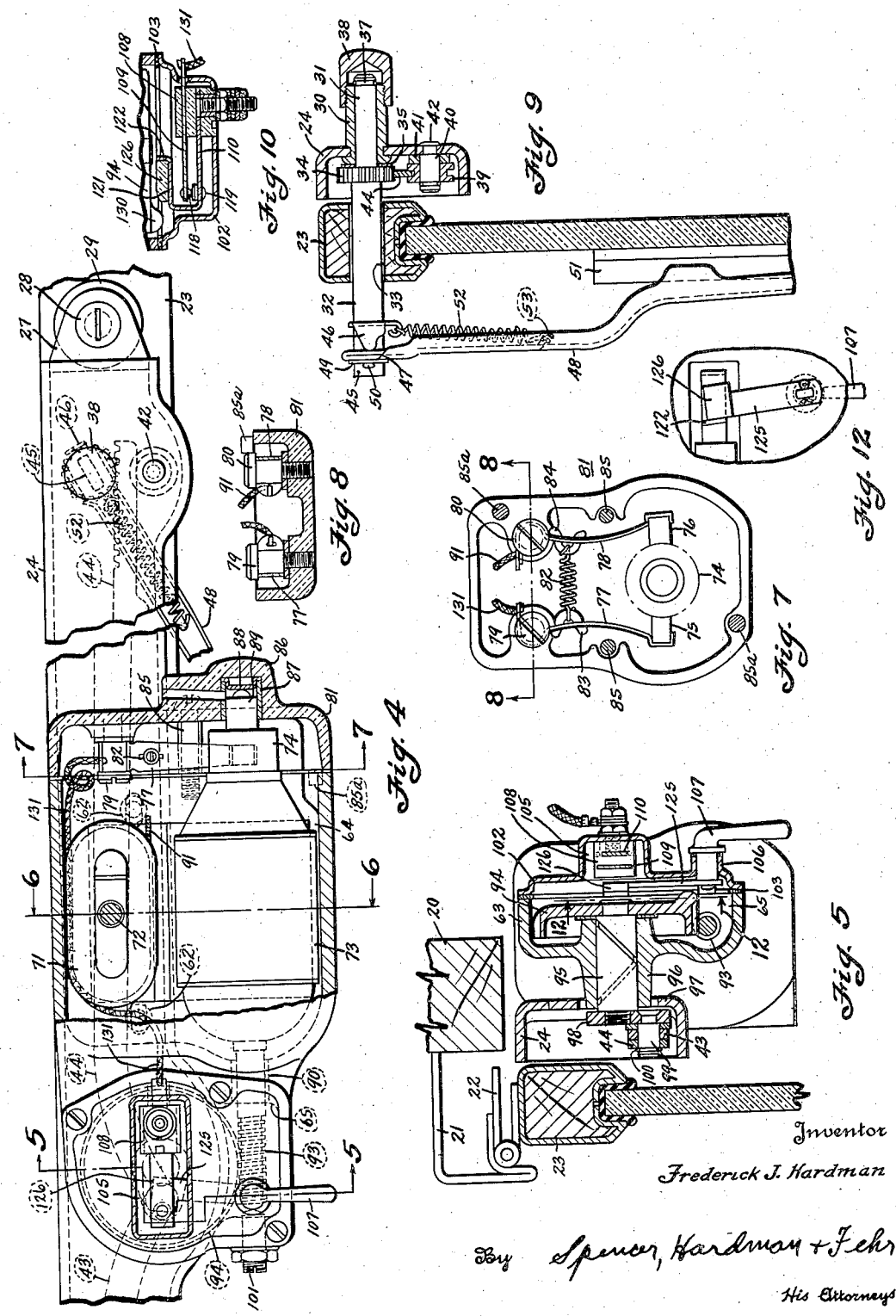

Patented Aug. 16, 1932

1,871,987

UNITED STATES PATENT OFFICE

FREDERICK J. HARDMAN, OF DAYTON, OHIO, ASSIGNOR TO DELCO-REMY CORPORATION, OF ANDERSON, INDIANA, A CORPORATION OF DELAWARE

WINDSHIELD WIPER

Application filed March 23, 1929. Serial No. 349,438.

This invention relates to improvements in windshield cleaners and has to do particularly with control means for the actuation thereof.

Among the several objects of the invention, it is to provide means for stopping the windshield cleaner mechanism only at the end of a stroke.

A further object of the invention is to provide means for stopping a train of mechanism at a predetermined point in its cycle of movement.

Further objects and advantages of the present invention will be apparent from the following description, reference being had to the accompanying drawings, wherein a preferred form of the embodiment of the present invention is clearly shown.

In the drawings:

Fig. 1 is a plan view of a device embodying my invention, with certain parts being broken away and shown in section for the sake of clearness of illustration.

Fig. 2 is an elevational view of the same, as seen from a point within the vehicle structure.

Fig. 3 is a section through a portion of the device as viewed in the direction of the arrows and along the line 3—3 of Fig. 1.

Fig. 4 is an enlarged detail with parts shown in section.

Fig. 5 is a sectional view through the transmission mechanism and contact device, as indicated by the line and arrows 5—5 of Fig. 4.

Fig. 6 is a sectional view through the driving motor as indicated by the line and arrows 6—6 of Fig. 4.

Fig. 7 is an elevational view of the motor housing cover, as indicated by the line and arrows 7—7 of Fig. 4.

Fig. 8 is a sectional view through the motor housing cover as indicated by the line and arrows 8—8 of Fig. 7.

Fig. 9 is a sectional view through the wiper mechanism as indicated by the line and arrows 9—9 of Fig. 2.

Fig. 10 is a longitudinal sectional view through the contact device, illustrating the contact elements in circuit closed relation.

Fig. 11 is a view similar to Fig. 10, but with the contact elements shown in circuit open relation as when the mechanism is to be stopped.

Fig. 12 is a view taken on the line 12—12 of Fig. 5.

With particular reference to the drawings 20 indicates a part of the vehicle cab structure, or a forward portion of the body enclosure, which forms one of the bounding rails for the windshield opening, and has attached thereto in any preferred manner, a channel or bracket member 21 to which are fixed hinge members 22 supporting a windshield rail 23 carrying the glass of the windshield. Upon the rail 23 there is mounted a channel member 24 which provides a support for the wiper mechanism and driving motor, and forms a housing for the motion translating mechanism connecting the driving motor with the wiper mechanism.

The channel member 24 is of elongated formation as generally exhibited in Figs. 1, 2, 3 and 4, and is held in spaced relation to the windshield rail 23 by means of screws 25 and the spacers 26 inserted between the channel member 24 and the rail 23, substantially as indicated in Fig. 3. The extreme ends of the channel member, are closed by means of an angular bracket 27 secured to the channel member, and apertured to receive a mounting screw 28 driven through a spacing washer 29 and into the rail 23.

Near each end of the channel member 24, there is provided a bearing sleeve 30 which rotatably supports a wiper shaft 31 having a driving extension 32 extending through a transverse aperture 33 in the windshield rail 23. The wiper shaft 31 is fixed to a pinion 34, and supports a bearing washer 35 within the channel member 24, and is retained with the bearing sleeve 30 by a spring ring 36 seated in an annular groove 37. The cap 38 threaded upon the end of the sleeve 30 provides a receptacle for lubricant for the shaft 31, and encloses the spring ring connection. Within the channel member and in substantially vertical alignment with the pinion 34, there is secured an idler or guide roller 39 by means of the shouldered pin 40 and the spacing washer 41 secured to the channel member as at 42.

The bearing sleeve 30 and the guide roller 39, are in sufficient spaced relation on the member 24 to provide for reception and guidance therebetween of either rack bar 43, or 44, which meshes with the pinion 34, and has operative connection with the driving motor presently to be described. The driving end 32 of the wiper shaft 31 is provided with a non-rounded or flattened portion 45 which drivingly engages a spring clip 46, a driving shank 47 of a wiping arm 48, and a washer 49 secured thereto by means of the cotter pin 50. The wiping arm 48 pivotally supports a wiping blade 51 which is urged in contacting relation with the windshield glass by means of a spring 52 connected to a tongue 53 struck from the arm 48, and attached to the spring clip 46 as illustrated in Fig. 9.

The channel member 24, provides a support for a driving motor 60 which is supported intermediate of the wiper shafts 31 by means of the mounting screws 62, as illustrated in Fig. 1. In the understood form the driving motor 60 is embodied in a die cast member 63, providing a motor housing 64 and a compartment 65 for motion translating mechanism connecting the motor shaft with the rack bars 43 and 44, hereinbefore described.

The power device within the housing 64, in the present instance, is an electric motor which requires magnetic field pieces. The housing 63 being of die cast formation is of non-magnetic material so that the common practice of using the housing as a magnetic field must be dispensed with, and thus separate field pieces 66, 67 are provided in the form of liners within the housing 63, the field pieces being cast in the housing at the time the housing is formulated. The field pieces 66 and 67 are provided with the paralleled extensions 68 and 69, which support a core 70 and field windings 71, by means of the bolt or screw 72. The opposite ends of the field pieces 66 and 67 are shaped to conform to the contour of the armature 73 of the electric power device.

The armature 73 has a commutator 74, engaged by brushes 75 and 76 carried by brush holders 77 and 78 respectively. These brush holders are pivotally supported upon studs 79 and 80 respectively, the studs being mounted within the end cover 81 which is formed of molded insulating material such as bakelite or the like. Brushes 75 and 76 are urged into engagement with the commutator 74, by a spring 82 interposed between the brush holders and secured thereto by the insulating loops 83 and 84 seated within a slot of each brush holder.

Insulating cover 81 fits over the open end of the housing 63 and provides a cover therefor, and also provides an insulating support for the brush holder studs 79 and 80. The cover is secured to the housing 63 by screws 85 which cooperate with the alignment studs 85a received in complementary recesses in the member 63, to maintain the motor bearings in correct relation. A lug 86 formed on the cover is recessed to receive a bearing sleeve 87 and a thrust cup 88, which provide a bearing for journalling one end of the armature shaft 89 of the armature 73, said armature shaft being journalled also in a bearing shaft 90 carried by a partition separating the chambers 64 and 65 of the casting 63. The brush holder 78 is in electrical communication with the field winding 71 through the lead wire 91. The brush holder 77 is in communication with any suitable source of electrical energy adapted to be connected with the stud 79, as will appear from the description to follow.

The end of the armature shaft 89, extending into the chamber 65, is provided with a worm 93 meshing with a worm wheel 94 rotatably supported in the compartment 65, by a shaft 95 journalled in a bearing portion 96, formed in the back wall of the housing 63. The channel member 24 is provided with an apertured embossment 97 for receiving the end of the bearing 96. The motor 60 is so mounted upon the channel member 24, as to present the end of the shaft 95 within the embossment 97 exterior of the bearing 96, to which is attached a crank member 98 supporting a crank pin 99, to which are rotatably secured the rack bars 43 and 44 by means of the spring ring 100.

The compartment 65 housing the motion transmitting mechanism, is provided with an adjustable thrust bearing 101 for proper adjustment of the motor within its bearings, and this chamber after being packed with grease or other lubricant is provided with the transmission cover 102 and gasket 103 which are secured in place by the cap screws 104.

The control means cooperating with parts of the moving mechanism for starting and stopping the mechanism in its operation, are associated with the transmission gear housing cover and become readily accessible by removal of the cover from the case. It embodies a contact device optionally movable into and out of engagement with a definitely operating element of the gear train between the driving motor and the wiper mechanism that it drives. In the present instance the contact device is housed within the cover 102, so as to be conditionally engageable by a part of the transmission mechanism as to the worm wheel 94. The cover 102 at the time of formation, is provided with the chamber 105, which forms a housing and support for the contact device in question. The cover 102 is further formed into a hollow boss 106 forming a bearing for a control member 107. Within the chamber 105 there is supported an insulating block 108, which has been molded about or otherwise secured to contact blades 109 and 110.

The blade 109 is provided with an extension 111 which protrudes through an aperture 112 in the side wall of the chamber 105 and provides a tab to which an electrical connector 113 is fixed. The blade 110 has one end thereof secured to an insert 114 within the body of the block 108, and to which is threadedly secured a terminal stud 115 which cooperates with a non-conducting washer 115a and nut 116 to secure the block and contact members in insulated relation with respect to the cover 102, all as shown in Figs. 10 and 11. The contact blades 109 and 110 are provided with the contact points 118 and 119 respectively, and the blade 110 is provided with the angular extensions 120 and 121 defining a U-shaped structure which terminates in a stop or abutment 122.

Within the bearing sleeve 106 there is pivotally supported the control member 107, which carries a resilient arm 125 carrying a non-conducting cam block 126 disposed against the angular extension 121 of the contact blade 110. It will be noted from this description and from a comparison with Figs. 4, 10 and 11, that an oscillatory movement of the control member 107 will cause the cam block 126 to be moved successively along the angular extension 121, and toward and away from the stop 122, to occupy the position illustrated either in Fig. 10 or Fig. 11. For cooperation with the cam block 126, when it has been moved to the stop position or that position illustrated in Fig. 11, there has been provided upon the worm wheel 94, a cam 130 located so as to engage the block 126 when in its path of movement. The cam block 126 is of such dimension, and is so mounted upon the member 125, that when engaged by the cam 130 it will bias the contact blade 110 to separate it from the contact blade 109, so as to open a circuit through the contact points 118 and 119.

The contact blade 110 through the terminal 115, and the blade 109 through the insulated conductor 131 complete the motor circuit, and when opened and closed at the points 118 and 119 will cause the motor to stop or start if they are in connection with the battery or other suitable source of current. Thus moving the control member 107 so that the cam block 126 is in the position illustrated in Fig. 10, the blades 109 and 110 will close the motor circuit which will cause the motor to operate the wiper mechanism. When it is desired to stop the operation of the wiper, the control member 107 is moved in the opposite direction so that the cam block is in the position shown in Fig. 11, in which instance rotation of the worm wheel 94 will cause the cam 130 to engage the block 126 which urges the blades to a separated relation opening the circuit to the driving motor, causes it to stop. It will be noted that the cam 130, is so located upon the worm wheel 94 and that the cam block 126 is so positioned relative to the cam 130, that the cooperative engagement therebetween will cause the wiper arm 48 to stop always in the same position and at the end of the wiping stroke.

While the form of embodiment of the present invention as herein disclosed, constitutes a preferred form, it is to be understood that other forms might be adopted, all coming within the scope of the claims which follow.

What is claimed is as follows:

1. In a device of the character described, the combination comprising, means supporting a pair of wiper shafts, a driving motor and transmission mechanism, a cover for said transmission mechanism supporting a contact device selectively operable by said transmission mechanism for controlling the energy circuit through said driving motor.

2. In a device of the character described, the combination comprising, a wiper mechanism, a driving motor, transmission means connecting the motor to the wiping mechanism, a housing for said motor and a part of said transmission mechanism, a contact device arranged on said housing for operation by said transmission mechanism to control the operation of said motor, and a part movable into position between the transmission mechanism and the contact device for actuating the same.

3. In an electrically operated windshield cleaner, the combination comprising, transmission mechanism and a housing therefor, and a contact device supported on said housing optionally operable by said transmission mechanism and a part movable into position between the device and transmission mechanism for controlling the operation of said driving motor.

4. In an electrically operated windshield cleaner, the combination comprising, a driving motor and transmission mechanism within a housing, a cover for said housing supporting a contact device conditionally operable by a part of said transmission mechanism, a part interposable between the said mechanism and device, and means for moving the said part for controlling the operation of said motor.

5. In an electrically operated windshield cleaner, the combination comprising, a driving motor, a transmission mechanism including a worm and worm wheel, a housing for said motor and said transmission mechanism, a cover for said housing supporting a contact device selectively operable by said worm wheel for controlling the operation of said motor, said worm wheel having cam means for engaging said contact device, and means for optionally causing motion to be transmitted from the cam to the contact device.

6. In an electrically operated windshield cleaner, the combination comprising, a driving motor, a transmission mechanism including a worm and worm wheel, a housing for said motor and said transmission mechanism, a cover for said housing supporting a contact device, and means operated by said worm wheel to actuate the contact device for de-energizing sad driving motor.

7. In an electrically operated windshield cleaner, the combination comprising, a driving motor, a transmission mechanism including a worm wheel provided with a cam, a housing for said motor and said transmission mechanism, a cover for said housing supporting a contact device selectively operable by said worm wheel for controlling the operation of said motor and wiping mechanism, said contact device comprising a pair of contact blades insulatingly supported on the transmission case cover, and means for optionally causing motion to be transmitted from the cam to the contact device.

8. In an electrically operated windshield cleaner, the combination comprising, a driving motor, a transmission mechanism including a worm and worm wheel, a housing for said motor and said transmission mechanism, a cover for said housing supporting a contact device selectively operable by said worm wheel, for controlling the operation of said motor, said contact device comprising a pair of contact members supported by an insulating block fixed to the said cover, and disposed in close proximity to said worm gear, a control member pivoted to said cover and provided with a spacing block for interposition between said worm wheel and one of said contact blades, and a cam upon said worm wheel engageable with said block for actuating the contact blades to open circuit relation.

9. In an electrically operated windshield cleaner, the combination comprising, a wiper mechanism, a driving motor, transmission means connecting the motor to the wiping mechanism a switch and a member movable into and out of position between the switch and the means for communcating motion from the said means to the switch for controlling the operation of said driving motor, and to cause it to stop at a predetermined point in the cycle of movement of the wiper mechanism.

10. In a windshield cleaner, the combination comprising, a driving motor, a wiper, a wiper driving mechanism, a switch for controlling the motor, and a member selectively movable into or out of position for transmitting motion from the mechanism to the switch.

11. A windshield cleaner having in combination, a wiper, an electric motor and translating mechanism connecting the two, a switch, a member optionally movable into and out of interposed relation between said switch and translating mechanism, means forming a part of the mechanism for moving said member whereby said switch will be actuated by said mechanism at a predetermined time in its cycle of movement, means to move said member out of said interposed relation for starting said mechanism, and to move said member into interposed relation between said mechanism and switch for stopping the mechanism.

12. In a windshield cleaner the combination comprising, a driving motor, a wiper mechanism, transmission mechanism connecting the same, and means actuated by said transmission mechanism for stopping said driving motor at a predetermined point in a cycle of movement, said means including a pair of switch contacts in the energy circuit of said driving motor and supported adjacent the transmission mechanism means conditionally operated by a part of the transmission mechanism to actuate the contacts for controlling the energy circuit through said driving motor.

13. In an electrically operated windshield cleaner, the combination comprising, a driving motor, a transmission mechanism including a revolvable member, a housing for the mechanism, a contact device carried by the housing and situated in close proximity to said revolvable member, and means optionally movable to a position between the member and contact device so that said contact device may be actuated by said member.

14. In an electrically operated windshield cleaner, the combination comprising, a driving motor, a transmission mechanism including a revolvable member, a housing for the mechanism, a circuit closing device including a resilient contact blade carried by the housing and situated in close proximity to said revolvable member, and means optionally movable into and out of position between the member and blade so that when the means is moved into said position the revolvable member will operate to flex the contact blade, said means when so moved and the contact blade resisting further movement of the revolvable member.

15. In an electrically operated windshield cleaner, the combination comprising, a wiper, an electric wiper operating mechanism, a control switch, a member movable by the mechanism for operating the switch, and means for manually moving the member into or out of interposed relation between the mechanism and the switch so that the switch may remain closed or may be opened by the mechanism.

In testimony whereof I hereto affix my signature.

FREDERICK J. HARDMAN.